(12) United States Patent  
Takamatsu et al.

(10) Patent No.: US 8,933,880 B2  
(45) Date of Patent: Jan. 13, 2015

(54) INTERACTIVE PRESENTATION SYSTEM

(75) Inventors: Kei Takamatsu, Osaka (JP); Kenshi Tsuruda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 279 days.

(21) Appl. No.: 13/349,574

(22) Filed: Jan. 13, 2012

(65) Prior Publication Data

US 2012/0182216 A1 Jul. 19, 2012

(30) Foreign Application Priority Data

Jan. 13, 2011 (JP) ................................ 2011-004688

(51) Int. Cl.
- *G09G 5/08* (2006.01)
- *H04N 9/31* (2006.01)
- *G06F 3/00* (2006.01)
- *G06F 3/038* (2013.01)
- *G06F 3/0346* (2013.01)

(52) U.S. Cl.
CPC .............. *H04N 9/3185* (2013.01); *G06F 3/005* (2013.01); *G06F 3/038* (2013.01); *G06F 3/0346* (2013.01); *H04N 9/3194* (2013.01)
USPC ............ 345/157; 345/162; 345/163; 345/166

(58) Field of Classification Search
None
See application file for complete search history.

(56) References Cited

U.S. PATENT DOCUMENTS

| | | | | |
|---|---|---|---|---|
| 4,742,473 A * | 5/1988 | Shugar et al. | ................. | 715/821 |
| 7,506,076 B2 * | 3/2009 | Kobayashi | ........................ | 710/8 |
| 7,746,321 B2 * | 6/2010 | Banning | ........................ | 345/157 |
| 8,049,729 B2 * | 11/2011 | Banning | ........................ | 345/169 |
| 8,149,215 B2 * | 4/2012 | Leung et al. | ................... | 345/158 |
| 8,176,414 B1 * | 5/2012 | Baluja | ........................... | 715/238 |
| 8,610,664 B2 * | 12/2013 | Kneissler et al. | ............. | 345/157 |
| 2001/0028342 A1 * | 10/2001 | Notagashira | .................. | 345/157 |
| 2003/0011566 A1 * | 1/2003 | Gomi et al. | .................... | 345/157 |
| 2004/0001043 A1 * | 1/2004 | Lin | ................................. | 345/157 |
| 2006/0028487 A1 * | 2/2006 | Hsiung et al. | ................. | 345/619 |
| 2007/0188475 A1 * | 8/2007 | Tamura | ......................... | 345/177 |
| 2007/0216644 A1 * | 9/2007 | Nam et al. | ..................... | 345/158 |
| 2007/0273646 A1 * | 11/2007 | Chao et al. | .................... | 345/157 |

(Continued)

FOREIGN PATENT DOCUMENTS

| | | |
|---|---|---|
| JP | 2003-076495 A | 3/2003 |
| JP | 2007-013306 A | 1/2007 |
| JP | 2007-172303 A | 7/2007 |
| JP | 2008-116706 A | 5/2008 |

*Primary Examiner* — Seokyun Moon  
*Assistant Examiner* — Josemarie G Acha, III  
(74) *Attorney, Agent, or Firm* — James W. Judge

(57) ABSTRACT

An interactive presentation system includes: an imaging device; an image analyzer that calculates information regarding a pointed position by using captured-image data; a controller that receives the information and operates based on an input from an input device; a storage device controlled by the controller to store the information; a pattern generator controlled by the controller to generate a pattern image; an image display device that receives an output from the pattern generator; and a projector that enlarges and projects an output from the image display device. Upon initialization based on the input from the input device, the controller defines a pointed position as a boundary position of a command, assigns the command to an area demarcated by the boundary position, and stores the boundary position in the storage device. After initialization, the controller compares a pointed position and the boundary position and executes the command associated to the information.

7 Claims, 18 Drawing Sheets

(56) References Cited

U.S. PATENT DOCUMENTS

| | | | |
|---|---|---|---|
| 2007/0290995 A1* | 12/2007 | Ting | 345/157 |
| 2008/0024443 A1* | 1/2008 | Horikiri | 345/157 |
| 2008/0036757 A1* | 2/2008 | Furukawa et al. | 345/418 |
| 2008/0106517 A1* | 5/2008 | Kerr et al. | 345/158 |
| 2008/0119237 A1* | 5/2008 | Kim | 455/566 |
| 2008/0119327 A1* | 5/2008 | Kitaori et al. | 477/120 |
| 2009/0091532 A1* | 4/2009 | Hockett | 345/158 |
| 2009/0115722 A1* | 5/2009 | Shan et al. | 345/157 |
| 2009/0244004 A1* | 10/2009 | Itani et al. | 345/157 |
| 2009/0244006 A1* | 10/2009 | Nagase et al. | 345/163 |
| 2010/0013860 A1* | 1/2010 | Mandella et al. | 345/650 |
| 2010/0118031 A1* | 5/2010 | Sun et al. | 345/441 |
| 2010/0123659 A1* | 5/2010 | Beeman et al. | 345/157 |
| 2010/0134702 A1* | 6/2010 | Kondo et al. | 348/744 |
| 2011/0063215 A1* | 3/2011 | Mishima et al. | 345/158 |

* cited by examiner

F I G. 1
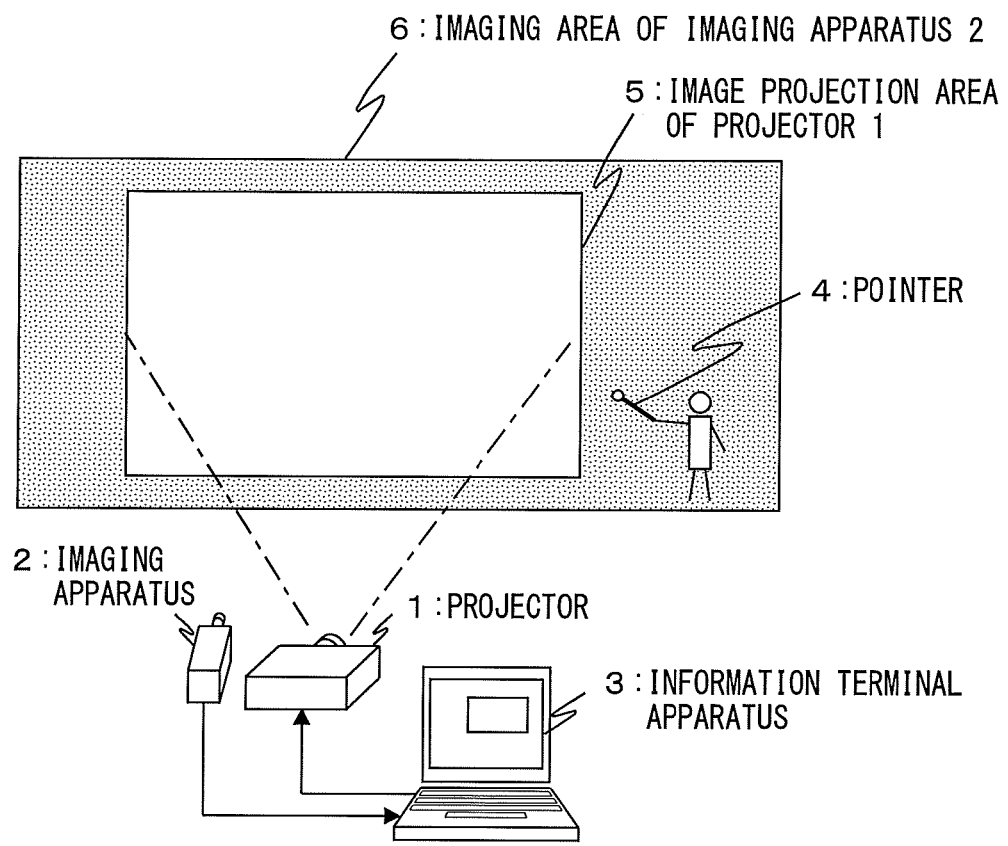

INTERACTIVE PRESENTATION SYSTEM

BACKGROUND OF THE INVENTION

1. Field of the Invention

The present invention relates to interactive presentation systems that use projectors.

2. Description of the Background Art

In recent years, projectors are widely used as apparatuses for presentations. Screens displayed on information terminal apparatuses can be enlarged and projected on image projection areas by simply connecting image output terminals of the information terminal apparatuses to projectors by using, for example, VGA cables or the like. Then, operations such as switching screens and turning a page forward can be performed on the information terminal apparatuses by using operational remote controls. However, recently, there has been a demand for presentation apparatuses allowing more interactive and diverse operations. In systems (e.g., Patent Literature 1) which have been developed in order to respond to such a demand, operation commands are assigned to positions on a menu screen displayed in an image projection area, and a command assigned to an arbitrary position within an area of the menu screen is executed when the position is pointed by using a pointer.

FIG. 18 shows a configuration of a conventional interactive presentation system. With regard to the reference characters, element 25 represents a projector capable of enlarging and projecting an image, element 26 represents an imaging apparatus capable of taking an image of an imaging area, element 27 represents an information terminal apparatus such as a personal computer or the like, and element 28 represents a transmission device such as a pointer or the like. Furthermore, element 29 represents an image projection area for receiving a projection from the projector 25, and element 30 represents an imaging area of the imaging apparatus 26.

The basic principle on how the above described system operates will be briefly described next. First, a pattern image (menu screen) is displayed in the image projection area of the projector. A presenter points to an arbitrary position in the pattern image by using a pointer. Then, an image of the pointer is taken by a recognition camera whose focus has been preset on the position of the image projection area constituting the whole imaging range. Next, the information terminal apparatus analyzes whether or not a specified position is in focus within image data received from the recognition camera, and identifies a position that is determined to be out of focus as positional information. An interactive operation is enabled by executing an operation command that is pre-associated with the positional information.

CITATION LIST

Patent Literature 1: Japanese Laid-Open Patent Publication No. 2003-76495
Patent Literature 2: Japanese Laid-Open Patent Publication No. 2008-116706
Patent Literature 3: Japanese Laid-Open Patent Publication No. 2007-172303
Patent Literature 4: Japanese Laid-Open Patent Publication No. 2007-13306

SUMMARY OF THE INVENTION

However, when performing an interactive operation with a conventional interactive presentation system by pointing to a menu screen in an image projection area, if the image projection area is a large screen, areas that cannot be reached and pointed by a presenter may exist on the screen. In such a case, operations become particularly difficult at an upper part of the screen. Furthermore, even when the image projection area is not a big screen, a presenter may not be able to reach and point the menu screen on the image projection area when the presenter is a child or person of shorter stature.

Still further, when operations are performed on the menu screen displayed in the image projection area, it is necessary to secure an area for the menu screen in order to prevent the menu screen from covering part of the contents. As a result, a problem arises where the area for displaying the contents of the presentation becomes small.

Therefore, an object of the present invention is to provide an interactive presentation system in which an operation area is disposed outside an image projection area of a projector and that includes a function of, when a presenter points to a position in the operation area by using a pointing device, executing an operation command associated with the position.

In order to achieve the above described object, an interactive presentation system of the present invention includes: an imaging device configured to capture an image; an image analysis device configured to calculate positional information regarding a pointed position by using image data of the image captured by the imaging device; a control device configured to receive the positional information calculated by the image analysis device as an input and operate based on information inputted from an input device; a storage device configured to store the positional information calculated by the image analysis device under control of the control device; a pattern generation device configured to generate a pattern image under control of the control device; an image display device configured to receive an output from the pattern generation device as an input; and a projector configured to enlarge and project an output from the image display device. In an initialization stage in which initialization is conducted based on the information inputted from the input device, the control device defines a pointed position as a boundary position of a command, assigns a predetermined command to an area demarcated by the boundary position, and stores the boundary position in the storage device. After the initialization stage, the control device compares a pointed position and the boundary position stored in the storage device in the initialization stage, and executes the predetermined command associated with the positional information regarding the pointed position.

Furthermore, with regard to the interactive presentation system, in the initialization stage, the control device causes the pattern generation device to output an initialization pattern image enabling specifying of an area for receiving an enlarged projection from the projector, and ascertains, based on positional information calculated by the image analysis device, a position-coordinate correlation between an area whose image is captured by the imaging device, and an area for receiving a projection from the projector.

Furthermore, the interactive presentation system includes: an imaging apparatus including an imaging device, an image analysis device, and a first communication device configured to communicate positional information calculated by the image analysis device; and an information terminal apparatus including a control device, a storage device, a pattern generation device, an image display device, and a second communication device configured to communicate with the first communication device and output the positional information to the control device; wherein the positional information consists exclusively of coordinate data.

Furthermore, the interactive presentation system includes: a projector including an imaging apparatus; and an information terminal apparatus.

Furthermore, with regard to the interactive presentation system, in the initialization stage, the control device causes the pattern generation device to output an image pattern clarifying a boundary position of a command which is stored in the storage device. Furthermore, the interactive presentation system includes an image overlap device configured to overlap the image pattern generated by the pattern generation device onto a main image outputted from the control device.

Furthermore, the interactive presentation system includes a transmission device configured to transmit a pointing signal. Furthermore, the imaging apparatus captures an image including the pointing signal transmitted from the transmission device, and the image analysis device calculates, as the positional information regarding a pointed position, positional information of the pointing signal transmitted from the transmission device by using the image data.

Furthermore, with regard to the interactive presentation system, an imaging area of the imaging device includes an image projection area of the projector and an area outside the image projection area.

Furthermore, with regard to the interactive presentation system, the boundary position stored in the storage device is included in the area outside the image projection area.

Furthermore, in order to achieve the above described object, a projector of the present invention is used for presentations given through interactive operations with instructions regarding a projected image, the projector including: an imaging device configured to capture an image; an image analysis device configured to calculate positional information regarding a pointed position by using image data of the image captured by the imaging device; a communication device configured to communicate positional information consisting exclusively of coordinate data calculated by the image analysis device; and a projector configured to project a pattern enabling assigning of a predetermined command, based on a control under an information terminal apparatus configured to, in an initialization stage in which initialization is conducted based on information inputted from an input device, define a boundary position of a command with a use of the positional information received from the communication device and assign a predetermined command to an area demarcated by the boundary position, and, after the initialization stage, execute the predetermined command based on the pointed position.

Furthermore, with regard to the projector, the imaging apparatus captures an image including a pointing signal transmitted from a transmission device; and the image analysis device calculates, as the positional information regarding a pointed position, positional information of the pointing signal transmitted from the transmission device by using the image data.

Furthermore, with regard to the projector, an imaging area of the imaging apparatus includes an image projection area of the projector device and an area outside the image projection area.

Furthermore, with regard to the projector, the boundary position stored in the storage device is included in the area outside the image projection area.

An advantageous effect obtained with the interactive presentation system of the present invention configured as described above is that, a pointed position can be identified by the system, by having boundary coordinate settings for an operation area to be set such that an operation area is formed at an arbitrary position outside an image projection area, and thereby a presenter can point the arbitrary position in the operation area to execute an operation command associated to the position. As a result, by setting boundary positions in the initialization stage, even when the image projection area is a big screen, there will not be any areas that cannot be reached and pointed by the presenter. Furthermore, even if the image projection area is not a big screen, a presenter of shorter stature, such as a child, may not be able to reach and point some areas, but such a problem can be solved by setting boundary positions at a low level in the initialization stage.

Furthermore, since it is not necessary to display a menu screen in an image projection area, parts of the contents of a presentation will not be covered by the menu screen.

BRIEF DESCRIPTION OF THE DRAWINGS

FIG. 1 shows a configuration of an interactive presentation system according to embodiment 1 of the present invention;

DESCRIPTION OF THE PREFERRED EMBODIMENTS

Figure 2:
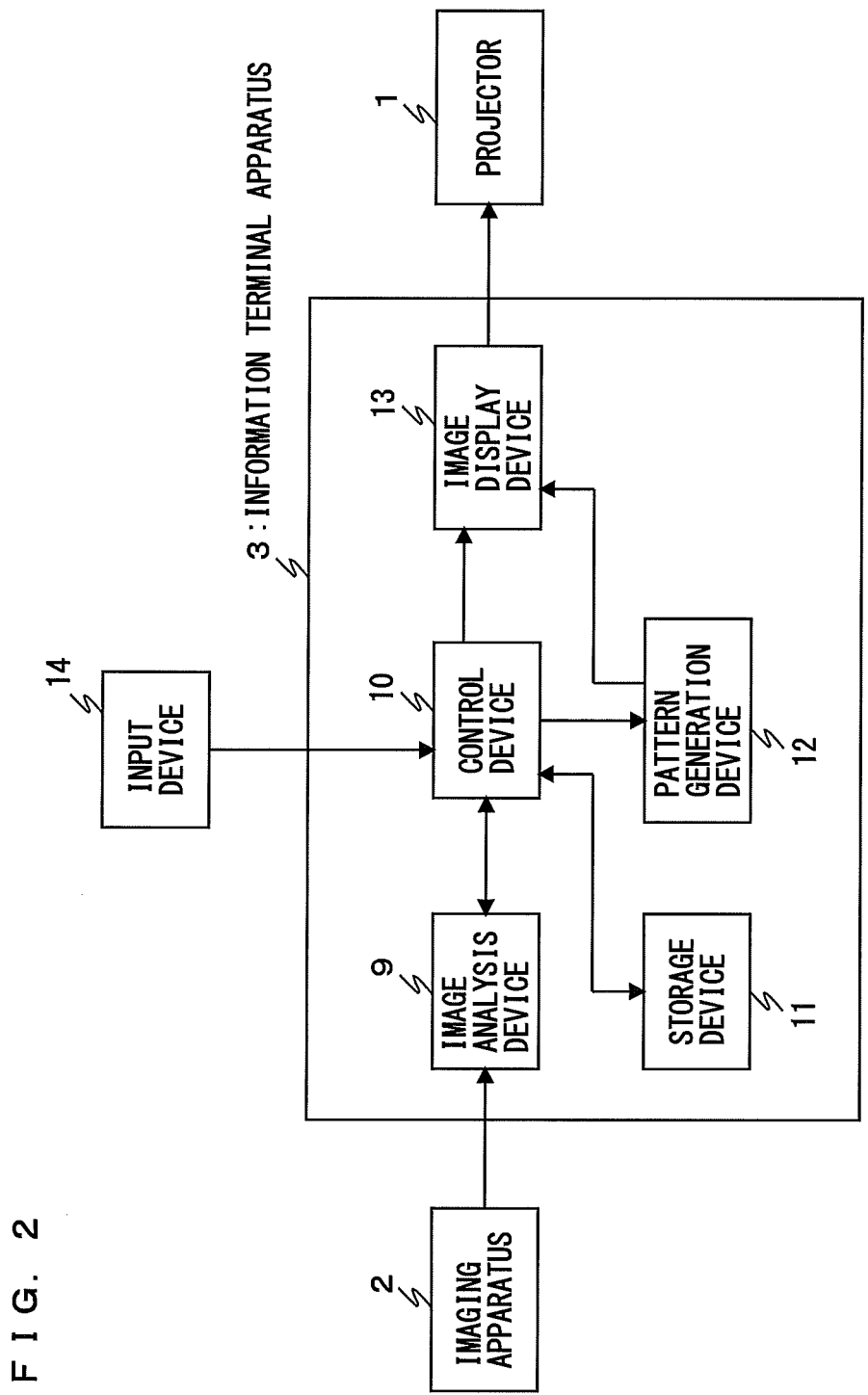
FIG. 2 is an internal block view of an information terminal apparatus according to embodiment 1.

Embodiments of the present invention will be described in the following with reference to FIG. 1 to FIG. 17.

Embodiment 1

FIG. 1 shows a configuration of an interactive presentation system according to embodiment 1 of the present invention.

With regard to reference characters in FIG. 1, element 1 represents a projector capable of enlarging and projecting an image, element 2 represents an imaging apparatus capable of taking an image of an imaging area, element 3 represents an information terminal apparatus such as a personal computer or the like, and element 4 represents a transmission device such as a pointer. Furthermore, element 5 represents an image projection area for receiving a projection from the projector 1, and element 6 represents an imaging area of the imaging apparatus 2.

FIG. 2 shows an internal configuration of the information terminal apparatus 3. With regard to reference characters in FIG. 2, element 9 represents an image analysis device (image analyzer) configured to analyze image data transmitted from the imaging apparatus 2, element 11 represents a storage device configured to store results of the analysis by the image analysis device 9, element 12 represents a pattern generation device (pattern generator) configured to generate an image pattern, element 13 represents an image display device, element 14 represents an input device such as a keyboard, a mouse, or the like, and element 10 represents a control device (controller) configured to control the pattern generation device 12 and the image display device 13.

In the following, an operation of the interactive presentation system having the above described configuration will be described with reference to FIGS. 3 and 4.

An example will be described next by using a flowchart in FIG. 4 for describing an operation. In this example, a dashed line in FIG. 3 is defined as a boundary line, an area above the boundary line is set as an operation area that functions as an enter key of the information terminal apparatus 3 when being pointed by the pointer 4, and an area below the boundary line is set as an operation area that functions as a backspace key of the information terminal apparatus 3 when being pointed by the pointer 4.

First, in order to set a boundary position, a presenter gives a setting start instruction by operating the information terminal apparatus 3 with a use of the input device 14 (step S1). The control device 10 that has received a setting start signal at step S1 controls the pattern generation device 12 and the image display device 13, and projects an image pattern generated by the pattern generation device 12 from the projector 1 via the image display device 13. For example, as shown in FIG. 3, an boundary coordinate setting screen having a message of "please specify a boundary position between the top and bottom" is projected on the image projection area 5 (step S2).

Next, the presenter transmits a pointing signal on an arbitrary position by using the pointer 4 (step S3). In this case, the pointing signal is preferably infrared ray that is emitted only when a button attached to the pointer 4 is held down. For example, when an infrared ray emitted at a wavelength of 950 nm is used as the pointing signal, the pointing signal can be easily detected without being mistaken for visible light that is commonly projected from the projector 1, by having a band-pass filter that is capable of detecting wavelengths around 950 nm and is mounted on the imaging apparatus 2. Since a mercury vapor lamp is generally used in the projector 1, the light projected from the projector 1 includes an infrared ray, and thereby the light may be misrecognized as the pointing signal. Therefore, by mounting an infrared cut filter onto the projector 1 for removing infrared components from the light projected from the projector 1, the imaging apparatus 2 can detect the pointing signal with more certainty.

Of course, there is also a method of using laser light emitted at a brightness that is higher than a certain threshold as the pointing signal. In such case, a signal that is brighter than a set luminance value will be identified as the pointing signal. Furthermore, similar advantageous effects can be obtained by having a specific shape or a specific color identified as the pointing signal.

At step S3, the imaging apparatus 2 that has detected the pointing signal transmits an image of the signal to the image analysis device 9. In the image analysis device 9, a boundary coordinate pointed by the presenter is calculated by using the image which has been transmitted (step S4). Since the imaging area 6 that can be imaged by the imaging apparatus 2 is determined in advance, the device that calculates the boundary coordinate at step S4 can set, for example, an upper left coordinate as the point of origin, height in the vertical direction as 300 points, and width in the horizontal direction as 400 points, as shown in FIG. 3. It is possible to ascertain the coordinate at which the pointing signal detected at step S3 exists with regard to the imaging area 6. In FIG. 3, when the pointing signal exists at a position of 200 points in the vertical direction, the image analysis device 9 stores a coordinate of 200 points in the storage device 11 (step S5). When the presenter uses the pointer 4 to emit the pointing signal at step S5, the coordinate of the pointing signal may not be stationary fixed at a single point, but instead may move around within a certain range in a random direction. For such a case, the image analysis device 9 can store, in the storage device 11, the coordinate position that has been intended by the presenter by storing, in the storage device 11, an average value of coordinates pointed within a certain period of time. After the desired coordinate position is set, the presenter completes boundary coordinate settings for the operation area by sending an end command to the information terminal apparatus 3 from the input device 14 so as to be executed, as shown in FIG. 3 (step S6). In the case with the example shown in FIG. 3, detection by the control device 10 is performed by having an area above the dashed line, namely an area from 0 to 200 points in vertical coordinates, set as an area that will be pointed for operating the enter key of the information terminal apparatus 3; and having an area exceeding 200 points set as an area that will be pointed for operating the backspace key of the information terminal apparatus 3.

After the boundary coordinate settings for the operation area are set at step S6, when the presenter emits a predetermined pointing signal to the pointer 4 (step S7), the image analysis device 9 detects a coordinate of the pointing signal via the imaging apparatus 2 (step S8). The control device 10 can easily determine whether the pointing signal is pointed for the enter key or the backspace key by comparing the coordinate detected at step S8 and the coordinate stored in the storage device 11. The control device 10 executes a predetermined command in accordance with an obtained detection result (step S9).

For example, at step S8, when the coordinate of the detected pointing signal is 170 points in the vertical direction, since the coordinate is a value smaller than the boundary position coordinate of 200 points stored in the storage device 11, the control device 10 operates the enter key. Such operation is associated to a page forwarding motion when a slide show of presentation software is executed on the information terminal apparatus 3. Generally, there is a large distance between the information terminal apparatus 3 and the image projection area 5 for receiving projections from the projector 1, and thereby it is difficult for the presenter to directly operate the information terminal apparatus 3 when the presenter is giving a presentation while standing beside the image projection area. It is often the case to assign another person for operating the information terminal apparatus 3, and in such case, it becomes necessary for the presenter to give instructions regarding timings for turning a page forward to the person operating the information terminal apparatus 3. However, with the configuration of the present invention, the presenter can freely turn a page forward or backward at his/her preferred timing, and can give a presentation in his/her preferred style.

However, the pointing signal provided by the presenter does not always point to a constant value, and may vertically vibrate at a certain degree. Therefore, when a position around 200 points is pointed by the presenter, the slide projected by the projector 1 may be continuously turned forward and backward, resulting in a presentation that is extremely difficult to follow. Such a problem can be easily avoided by having the control device 10 set, as a void area, around 5% (15 points in the example in FIG. 3, namely, an area between 185 points and 215 points in vertical coordinates) of the boundary position coordinate stored in the storage device 11.

Figure 3:
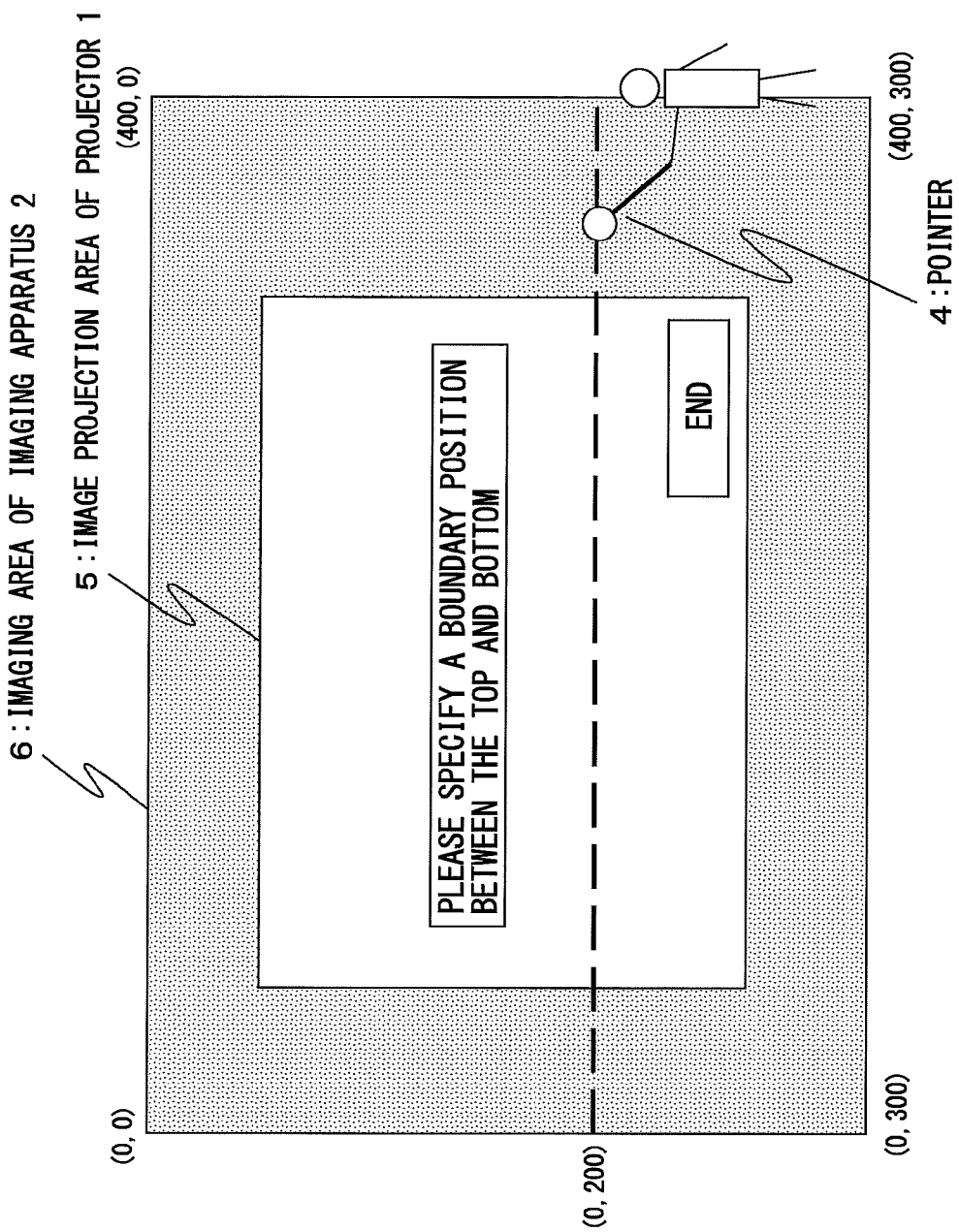
FIG. 3 shows one example of a boundary coordinate setting screen according to embodiment 1.
Figure 4:
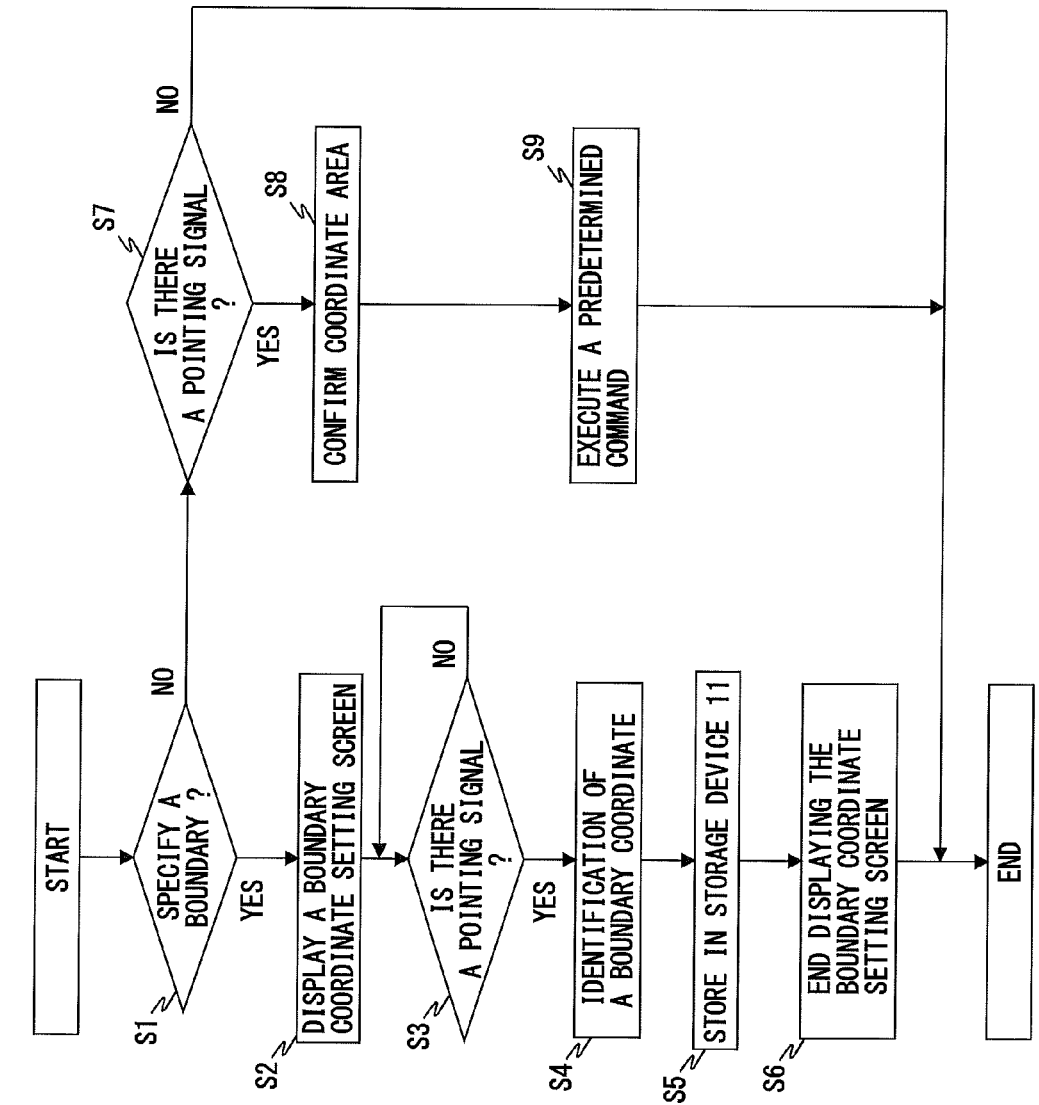
FIG. 4 is a flowchart for describing an operation of a boundary coordinate setting system according to embodiment 1.
Figure 5:
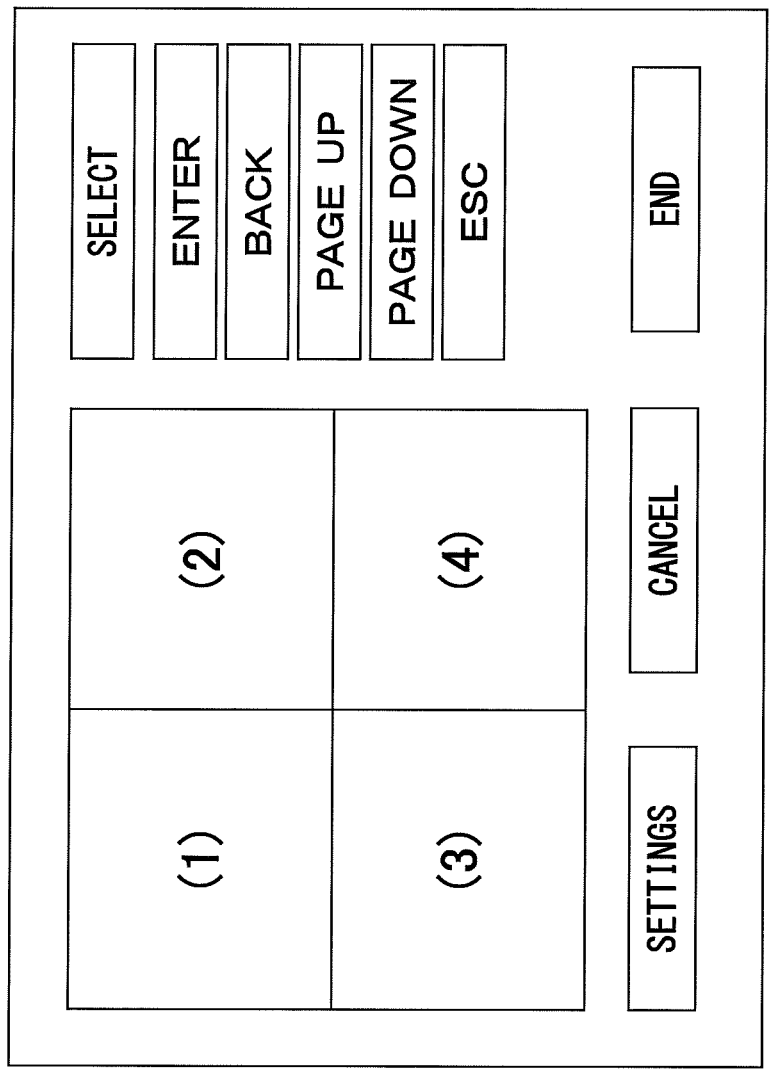
FIG. 5 shows one example of an image outputted from an image display device according to embodiment 1.

In the example in FIG. 3, although a top-bottom boundary position has been specified, it is needless to say that similar advantageous effects can also be obtained when a right-left boundary position is specified. Furthermore, it is also possible to have four operation areas when top to bottom and right to left are partitioned. In addition, when an image shown in FIG. 5 is displayed by the pattern generation device 12 via the image display device 13 at step S2, the presenter can set arbitrary commands to respective areas (1) to (4). For example, in FIG. 5, the area (1) is defined as an area ranging from 0 to 200 points in horizontal coordinates and from 0 to 150 points in vertical coordinates. When the presenter designates the area (1) by holding down a setting button and then selects ENTER from a selection menu, and when the pointing signal is detected in the area (1), the enter key will be executed. By outputting such a menu screen from the information terminal apparatus 3, the presenter can freely assign an operation command to each of the areas. It is needless to say that similar advantageous effects can also be obtained when, instead of the operation commands for the information terminal apparatus 3 as shown in FIG. 5, operation commands for the projector 1, the imaging apparatus 2, or peripheral devices are assigned.

With the configuration shown in FIG. 2, the image data of a taken image is transmitted from the imaging apparatus 2 to the information terminal apparatus 3. Such configuration may have some problems including: a necessity to use a special dedicated cable between the imaging apparatus 2 and the information terminal apparatus 3, and an increased burden on the whole system due to having a large communication load caused by transmitting image data with large data volume. Such problems can be easily solved by employing a configuration shown in FIG. 6.

Figure 6:
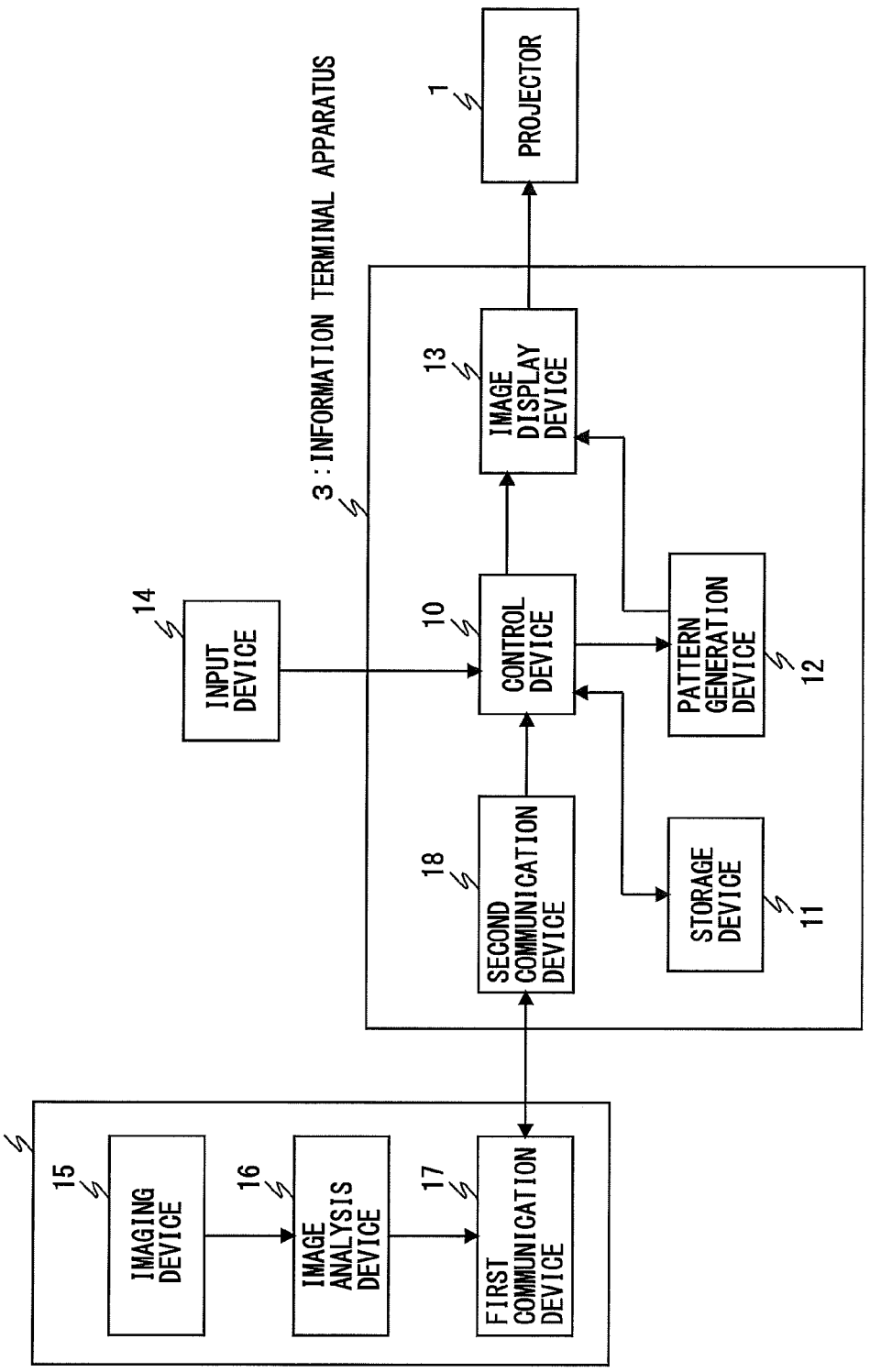
FIG. 6 is an internal block view of the information terminal apparatus and the imaging apparatus, each of which including a communication device according to embodiment 1.

With regard to the reference characters in FIG. 6, element 15 represents an imaging device for taking an image, element 16 represents an image analysis device (image analyzer) configured to conduct calculations on the image taken by the imaging device 15, element 17 represents a first communication device such Ethernet (registered trademark) and USB, and element 18 represents a second communication device configured to communicate with the first communication device 17 on a network.

In a system in FIG. 6 in which the imaging apparatus 2 and the information terminal apparatus 3 are capable of communicating with each other on a network, the image analysis device 16 detects a pointing signal from image data of an image taken by the imaging device 15 (step S3), identifies a desired boundary coordinate as similarly to the image analysis device 9 (step S4), and conveys only the coordinate data of the coordinate to the first communication device 17. A desired operation can be performed by having the second communication device 18, which is capable of communicating with the first communication device 17 on a network, transmit the received coordinate data to the control device 10. Since conveying of only the coordinate data is conducted on a network as described above, an advantageous effect can be obtained in which the system can be operated while having a low communication load even when a generally available cable is used.

Figure 7:
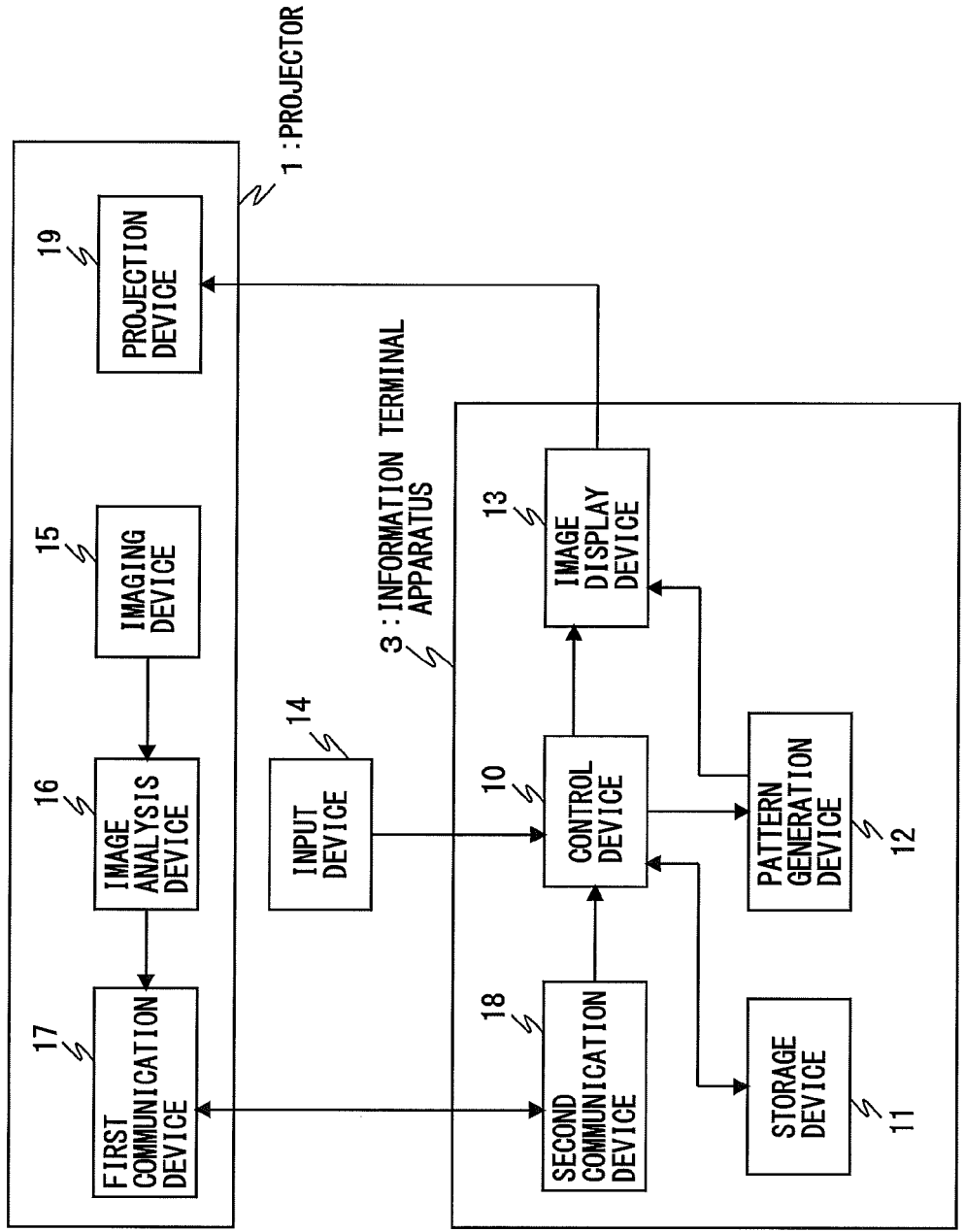
FIG. 7 is an internal block view of the information terminal apparatus and a projector, each of which including a communication device according to embodiment 1.

Furthermore, as shown in FIG. 7, it is needless to say that similar advantageous effects can be obtained when the imaging device 15, the image analysis device 16, and the first communication device 17 are installed on the projector 1. With regard to the reference characters in FIG. 7, element 19 represents a projection device (projector) configured to enlarge and project the image data outputted from the image display device 13.

With the present embodiment described above, an advantageous effect can be obtained in which the presenter is allowed to freely operate the information terminal apparatus 3 even when there is a large distance between the information terminal apparatus 3 and the image projection area for receiving a projection from the projector, since operations of the information terminal apparatus 3 can be easily executed as result of detecting a pointing signal transmitted from the pointer and calculating a coordinate of the pointing signal. Furthermore, it is not necessary to overlap an area for operating commands of the information terminal apparatus 3 onto an image projected from the projector. Therefore, the presenter can obtain an advantageous effect of completely being relieved from minding the image projection area for receiving a projection from the projector even when the image projection area for receiving a projection from the projector is set at a position higher than the height of the presenter, since the boundary coordinate can be set within the range of the imaging area 6 of the imaging apparatus 2. This can easily solve a conventional problem of not being able to reach and operate an image projection area that is set too high for the presenter due to having an operation command area overlapped onto the image projected from the projector.

Embodiment 2

Figure 8:
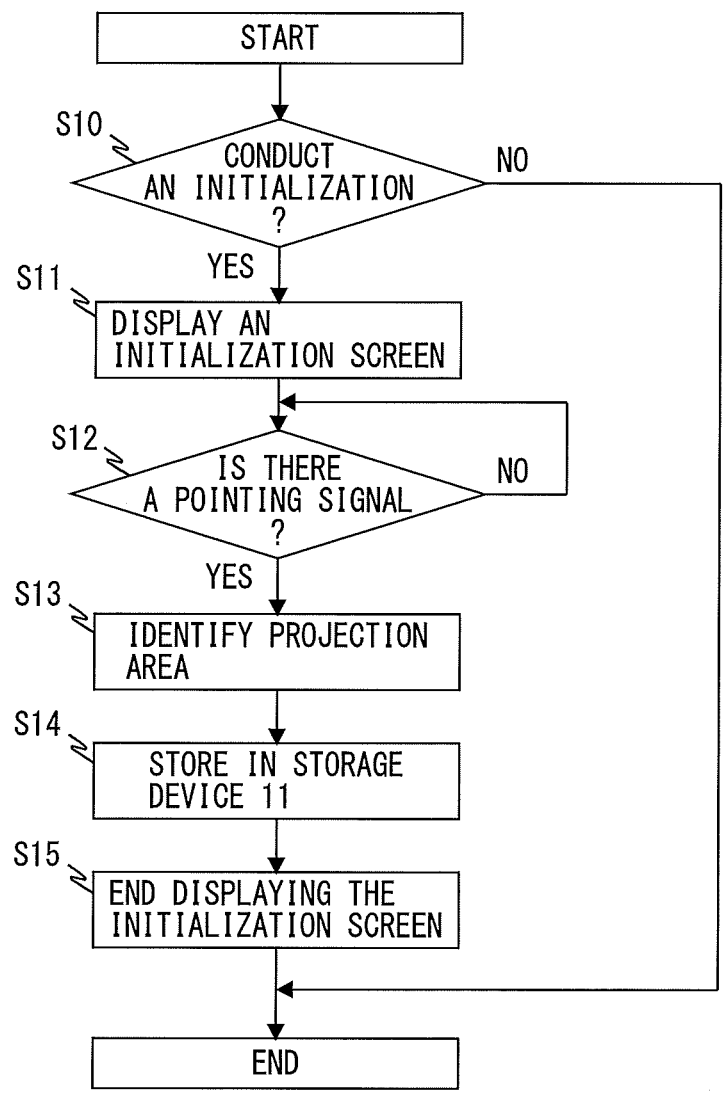
FIG. 8 is a flowchart for describing an operation of an interactive presentation system according to embodiment 2 of the present invention.

FIG. 8 is a flowchart for describing an operation of an interactive presentation system according to embodiment 2 of the present invention.

Figure 9:
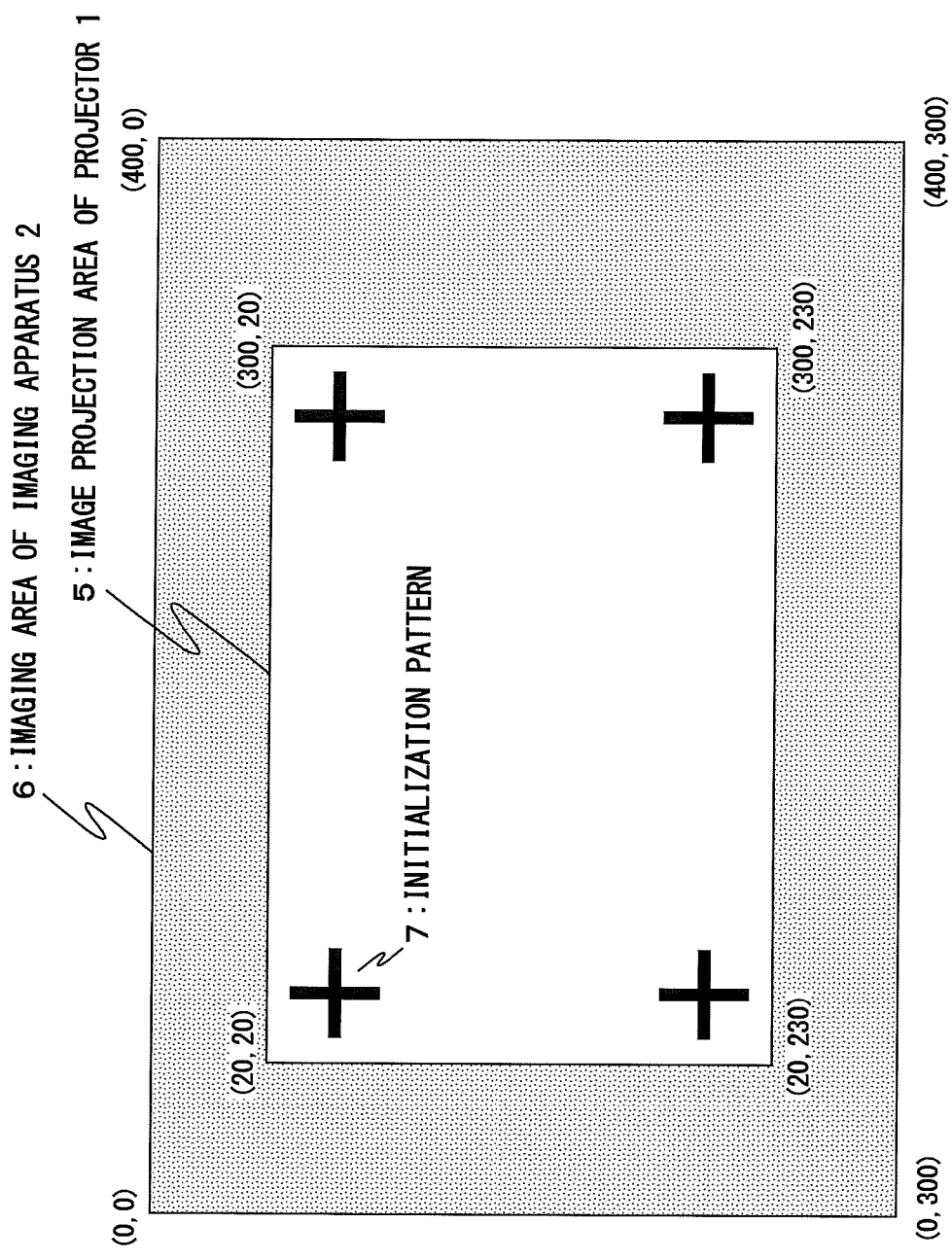
FIG. 9 shows one example of an initialization pattern image generated by a pattern generation device according to embodiment 2.

First, the presenter issues an initialization command to the information terminal apparatus 3 by using the input device 14 in order to ascertain where the image projection area 5 for receiving a projection from the projector 1 exists in the imaging area 6 of the imaging apparatus 2 (step S10). The control device 10 that has received the initialization command at step S10 causes the pattern generation device 12 to project initialization patterns 7 shown in FIG. 9 from the projector 1 via the image display device 13 (step S11). In FIG. 9, an example is shown in which four cross-shaped characters are disposed as the initialization patterns 7 at four corners of the image projection area 5 of the projector 1. It is needless to say that similar advantageous effects can also be obtained when the number of such characters is not four, or when the shape of the image projected from the pattern generation device 12 is not cross-shaped.

After step S11, the presenter points a tip portion of the pointer 4 to portions that are to be central portions of the initialization patterns 7 and transmits pointing signals (step S12). The pointing signals are detected by the image analysis device 9 via the imaging apparatus 2, and are analyzed to obtain a result that identifies the intended image projection area 5 (step S13). Described next is a case where it is determined that center coordinates of the initialization patterns 7 generated by the pattern generation device 12 are disposed at, for example, 10% inside respective corners. As a standard for the imaging area 6 of the imaging apparatus 2, when an origin coordinate on the upper left side is set at 20 points in horizontal coordinates and 20 points in vertical coordinates as shown in the example in FIG. 9, the actual size of the image projection area 5 for receiving a projection from the projector 1 is:

horizontally: 300 points−20 points=280 points vertically: 230 points−20 points=210 points.

Here, when the coordinates of the initialization patterns 7 where the pointing signals have been detected by the image analysis device 9 at step S12 are:

upper left: 48 points in horizontal coordinates, 41 points in vertical coordinates;

lower left: 48 points in horizontal coordinates, 209 points in vertical coordinates;

upper right: 272 points in horizontal coordinates, 41 points in vertical coordinates;

lower right: 272 points in horizontal coordinates, 209 points in vertical coordinates, the coordinate of the point of origin is, in horizontal coordinates 48−(272−48)/8=20 points, and, in vertical coordinates 41−(209−41)/8=20 points.

In this manner, at step S13, as a standard of the imaging area 6 for the imaging apparatus 2, the coordinate of the point of origin of the image projection area 5 of the projector 1 can be derived as 20 points in horizontal coordinates and 20 points in vertical coordinates. This coordinate information is stored in the storage device 11 (step S14). Then, after the initialization screen is closed, the information terminal apparatus 3 can ascertain the relationship between the imaging area 6 of the imaging apparatus 2 and the image projection area 5 of the projector 1 (step S15).

In order to obtain the relationship between the image projection area 5 of the projector 1 and the imaging area 6 of the imaging apparatus 2 with certainty, the imaging device 15 and the projection device 19 may both be included in the projector 1 as shown in FIG. 7. Furthermore, by employing the calculation method as described above, correlating coordinates can be calculated with certainty even when a zoom lens is used in the projection device 19.

In a state where the relationship between the imaging area 6 of the imaging apparatus 2 and the image projection area 5 of the projector 1 is ascertained through the flowchart in FIG. 8 for describing the operation, when the presenter sets the boundary coordinate settings as shown in FIG. 3 and sets 200 points in the vertical direction as a boundary coordinate that is to be used as a standard for the coordinates of the imaging area 6 of the imaging apparatus 2, the presenter can easily ascertain where the 200 points correspond in the imaging range for receiving a projection from the projector 1. When the relationship between the imaging area 6 of the imaging apparatus 2 and the image projection area 5 of the projector 1 is set as shown in FIG. 9, it can be understood that a boundary position exists, from the upper part, at:

(200−20)/210=85.7%.

More specifically, when the size of the image data outputted from the information terminal apparatus 3 is an XGA size (1024 dots in the horizontal direction, 768 dots in the vertical direction), it can be understood that this boundary position exists, for the upper part, at:

768×85.7%=658 dots.

Figure 10:
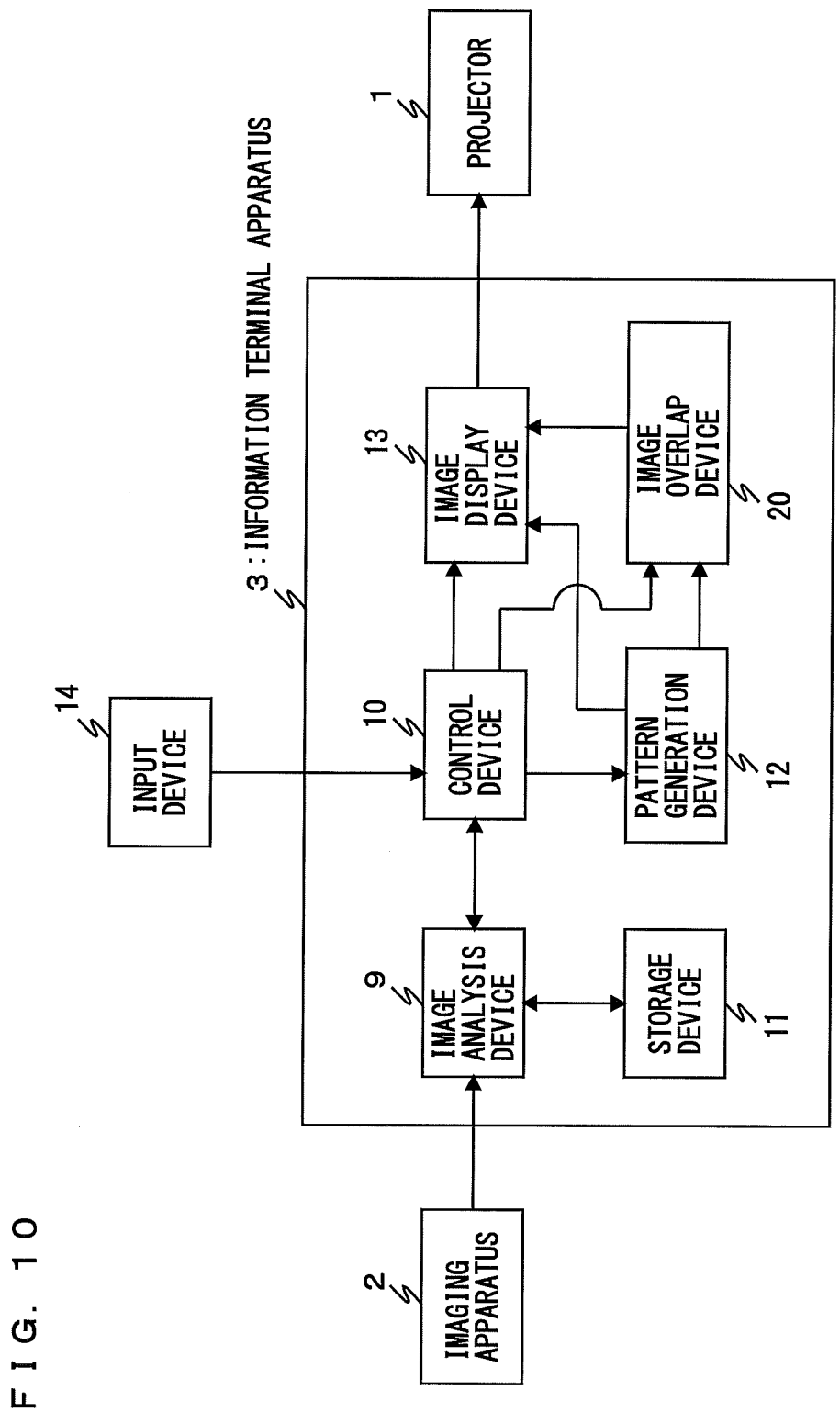
FIG. 10 is an internal block view of an information terminal apparatus including an image overlap device according to embodiment 2.
Figure 11:
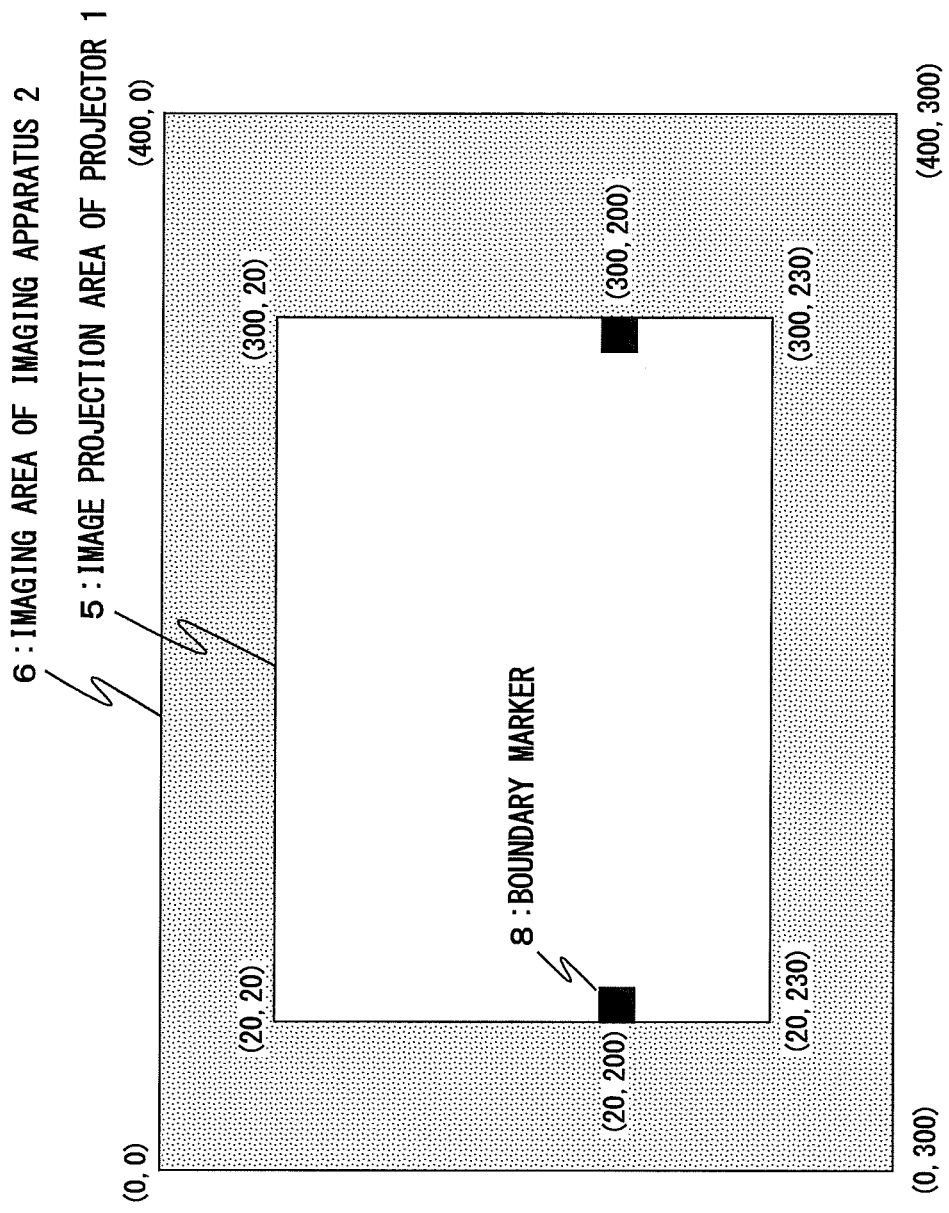
FIG. 11 shows one example of a boundary marker image generated by the pattern generation device according to embodiment 2.

In FIG. 10, the control device 10 that has ascertained the boundary position coordinates outputs, to the pattern generation device 12, positions for images of boundary markers 8 as shown in FIG. 11 at 658 dots from the upper part. The boundary marker images are overlapped onto a main image outputted from the control device 10 by an image overlap device-20, and a resulting image is projected from the projector 1 via the image display device 13.

As shown in FIG. 11, by having the boundary markers 8 displayed on the image projection area 5 of the projector 1, the presenter can easily ascertain the boundary positions and can execute a desired command with certainty without wavering. A method in which the presenter freely selects the shape, size, and color of the boundary markers 8 may be employed. Furthermore, a method of using a color that is complementary to the originally displayed color for making the positions distinct may be employed. Since colors displayed on a display are the three primary colors of RGB, for example, when luminance levels of the colors at a position are red (R)=255,
green (G)=255, and
blue (B)=0, to obtain yellow,
red (R)=0,
green (G)=0, and
blue (B)=255, provide blue that can easily make the boundary markers 8 distinct. When the boundary markers 8 are projected from the projector 1 in such manner, the presenter can operate the information terminal apparatus 3 with certainty without waver even when the number of partitions is increased.

Figure 12:
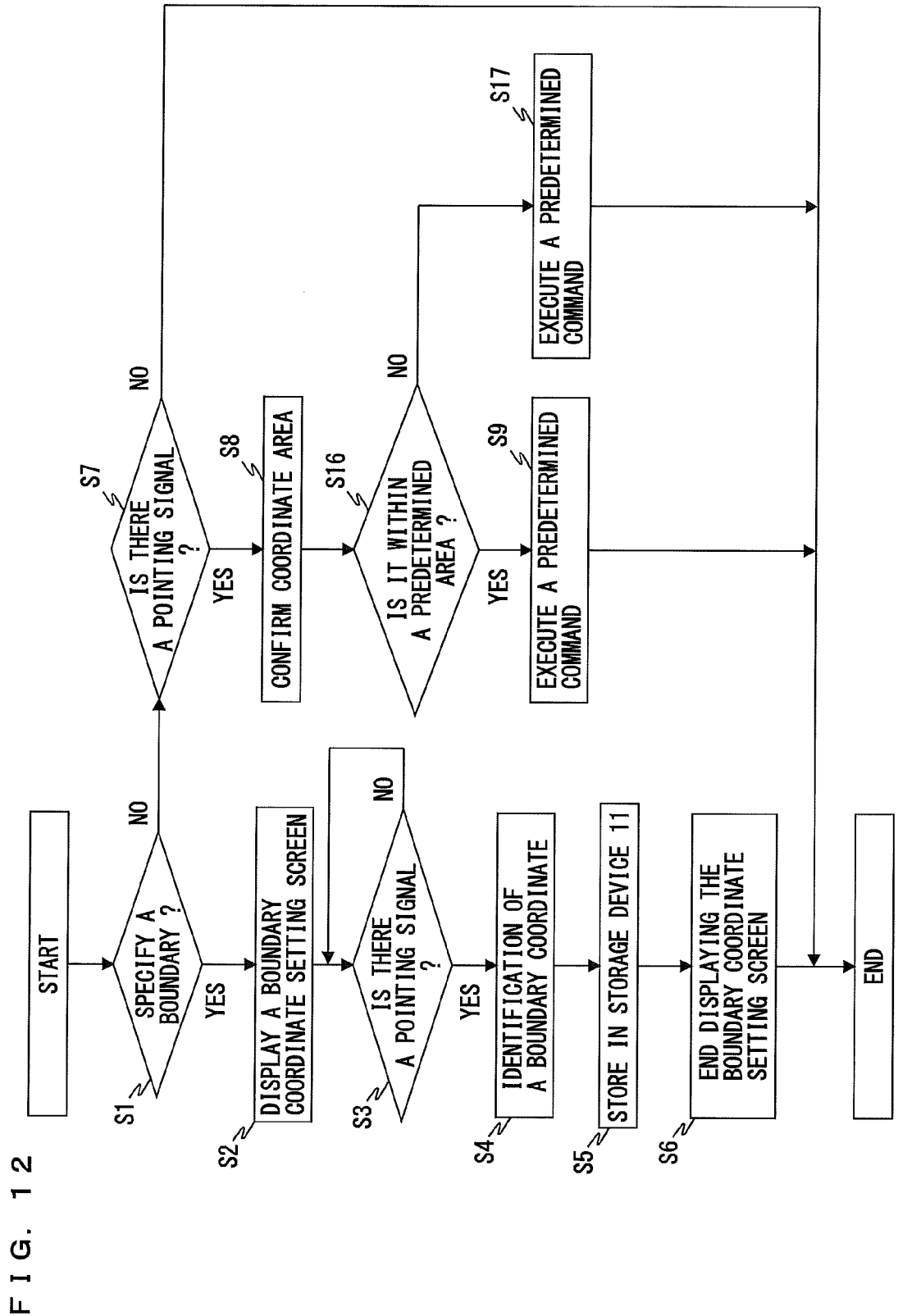
FIG. 12 is a flowchart for describing an operation of a coordinate area confirmation system according to embodiment 2.
Figure 13:
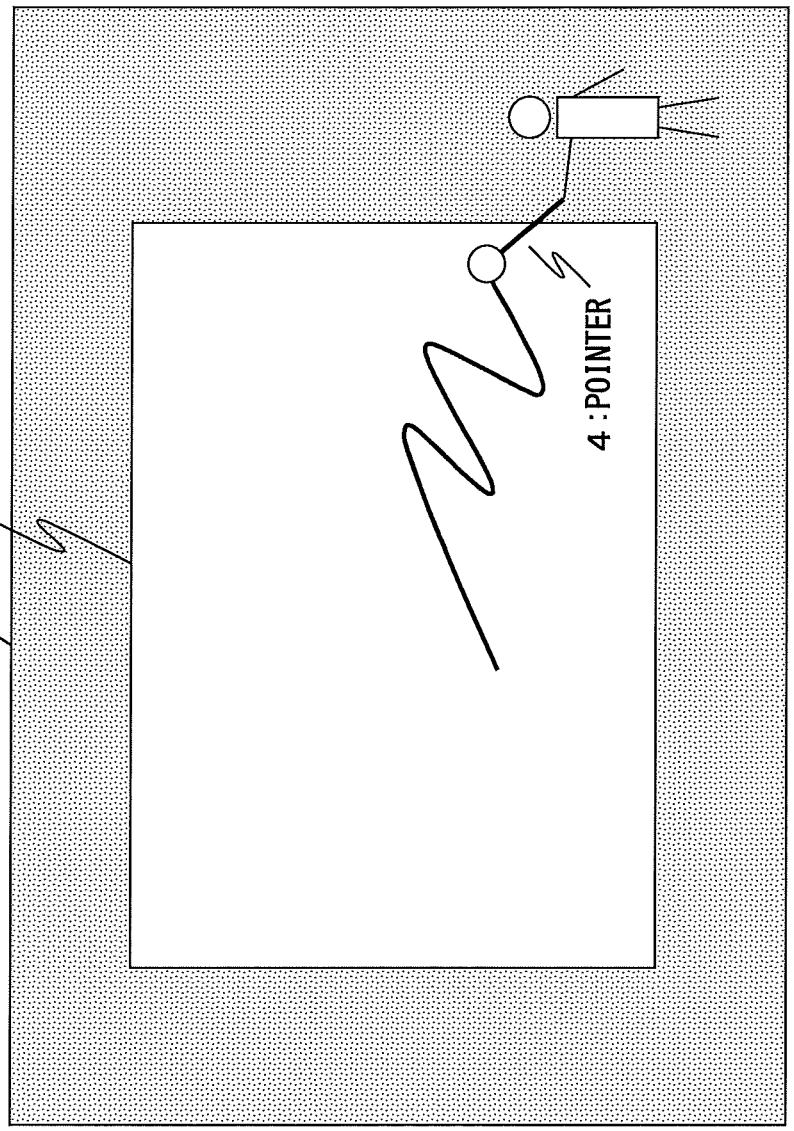
FIG. 13 shows one example of an operation of an interactive function (rendering) according to embodiment 2.

Furthermore, in the state where the relationship between the imaging area 6 of the imaging apparatus 2 and the image projection area 5 of the projector 1 is ascertained through the flowchart in FIG. 8 for describing the operation, a coordinate to which the pointing signal has been transmitted can be confirmed at step S8, and the coordinate can be determined whether or not to exist inside the image projection area 5 for receiving a projection from the projector 1 as shown in FIG. 12 (step S16). For example, in the example in FIG. 11, when the coordinate indicated at step S16 by the pointing signal is 250 points in the horizontal direction and 215 points in the vertical direction, the control device 10 identifies that the pointing signal is currently transmitted at a position inside the image projection area 5 of the projector 1, and can operate, for example, an interactive function as shown in FIG. 13.

Generally, the interactive function is a function enabling overlapping of an image on a screen projected from the projector 1. When overlapping an image cannot be conducted in the configuration shown in FIG. 3, there is a problem where a certain operation command of the information terminal apparatus 3 may always be executed. Thus, by having the present configuration and by determining at step S16 whether the pointing signal is located inside or outside the image projection area 5 of the projector 1, it can be easily distinguished whether a predetermined command is to be executed at step S9 or at step S17.

As described above, according to the present embodiment, by ascertaining the relationship between the image projection area of the projector and the imaging area 6 of the imaging apparatus 2, advantageous effects can be obtained in that the boundary markers can be overlapped onto the image projected from the projector and that the presenter can easily ascertain the boundary coordinate positions of the information terminal apparatus 3. Furthermore, the same pointer can also be used for the interactive function of application software.

Embodiment 3

Figure 14:
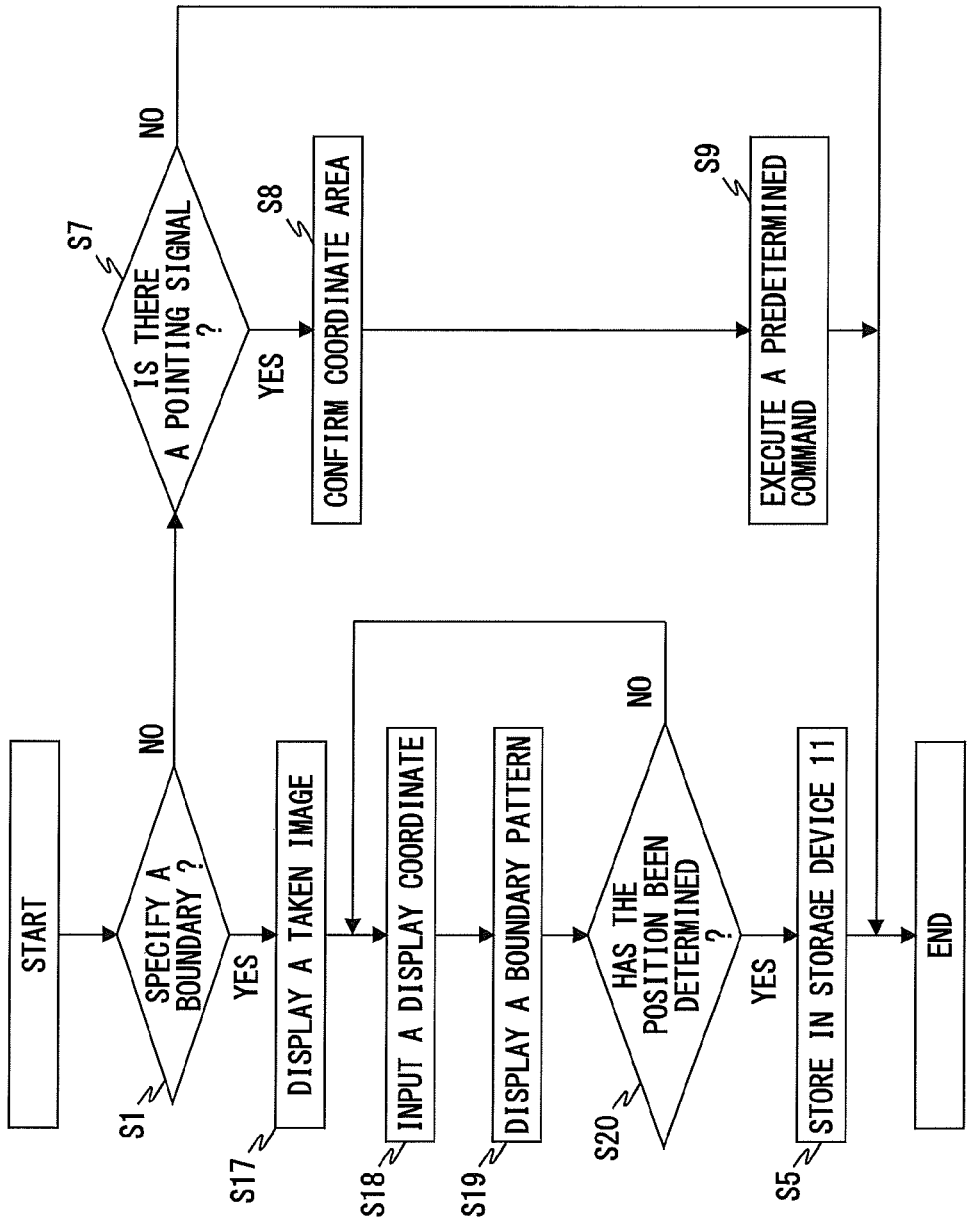
FIG. 14 is a flowchart for describing an operation of an interactive presentation system according to embodiment 3 of the present invention.
Figure 15:
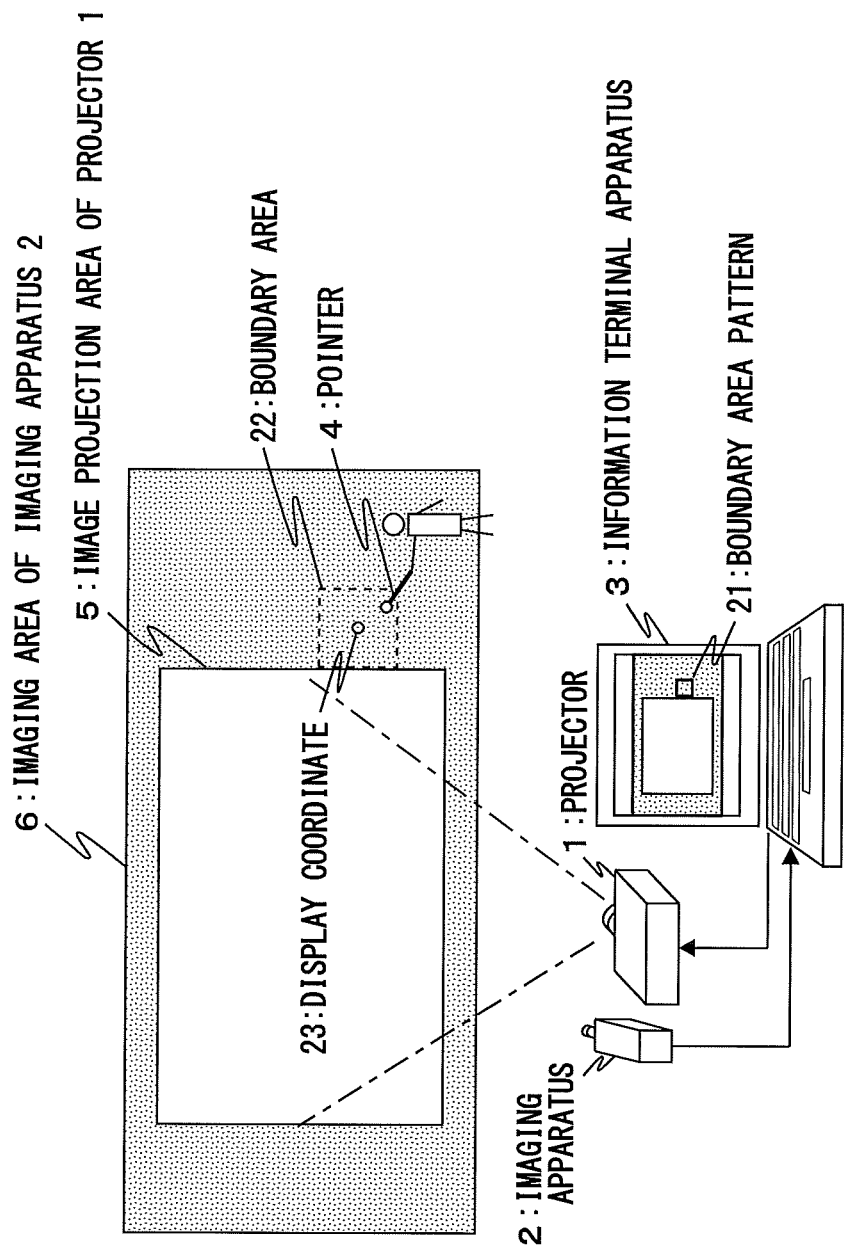
FIG. 15 shows one example of a boundary area pattern generated by a pattern generation device according to embodiment 3.

FIG. 14 is a flowchart for describing an operation of an interactive presentation system according to embodiment 3 of the present invention, and FIG. 15 shows one example of a boundary area pattern 21 of a pattern generation device according to embodiment 3. With regard to the reference characters in FIG. 15, element 21 represents a boundary area pattern displayed on the information terminal apparatus 3, element 22 represents a boundary area obtained when the boundary area pattern 21 is set, and element 23 represents a display coordinate for uniquely determining a position for displaying the boundary area pattern 21 on a taken image.

An example will be described by using the flowchart in FIG. 14 for describing an operation, and in this example, a square illustrated by a dashed line in FIG. 15 is set as the boundary area 22, and the area within the boundary area 22 is set as an operation area.

First, in order to specify the boundary area 22 by using the information terminal apparatus 3, the presenter issues an image display command by operating the information terminal apparatus 3 with a usage of the input device 14 (step S17). The control device 10 that has received the image display command at step S17 acquires a taken image for the image display device 13, and displays the taken image on the information terminal apparatus 3 via the image display device 13. After step S17, an input of a display coordinate is conducted on the information terminal apparatus 3 by using the input device 14 (step S18). When the control device 10 receives the display coordinate at step S18, the image overlap device 20 overlaps an image of the boundary area pattern 21 shown in FIG. 15 by using a position of the display coordinate of the image outputted from the control device 10 as a center coordinate, and the image is displayed on the information terminal apparatus 3 via the image display device 13 (step S19).

Shown in FIG. 15 is an example in which the boundary area pattern 21 having a square shape is displayed on the information terminal apparatus 3 as the boundary area pattern 21; however, similar advantageous effects can also be obtained when the number of the boundary area pattern 21 is more than one, or when the shape of the boundary area pattern 21 is not a square, or when there are different sizes for the boundary area pattern 21. In addition, although an example is described in which the center of the shape of the boundary area pattern 21 is defined as the coordinate for the display coordinate 23, the coordinate for the display coordinate 23 does not necessary have to be the center of a pictorial figure as long as the coordinate of the boundary area pattern 21 and the coordinate of a single point in the area are stored in the storage device 11.

It should be noted that the pointing signal pointed by the presenter may vertically vibrate at a certain degree. In this case, particularly when there are multiple boundary area patterns 21 set adjacent to each other, there is a possibility of multiple commands being executed one after another, resulting in a presentation that is extremely difficult to follow. Such a problem can be easily avoided by setting, as a void area, around 5% of the boundary position coordinate stored in the storage device 11 of the control device 10. It becomes impossible to set operation commands when the multiple boundary area patterns 21 share the same area. Such a problem can be easily avoided by setting the area of a boundary area pattern 21 whose display coordinate 24 is set in advance as a void area for another one of the boundary area patterns 21.

After step S19, the presenter issues a determination command to the information terminal apparatus 3 for determining a position of the display coordinate by using the input device 14 (step S20). The control device 10 that has received the determination command at step S20 stores, in the storage device 11, the coordinate of the center position of this boundary area pattern and the coordinates for the shape of the pattern (step S5). As a result, it becomes easy to determine which command is being pointed by the pointing signal, by comparing the coordinate of the pointing signal detected at step S8 and the coordinate of the boundary area 22 stored in the storage device 11. An obtained detection result enables the control device 10 to execute a predetermined command. Since the boundary area pattern 21 is not actually projected in the imaging area 6 of the imaging apparatus 2 when a presentation is being conducted, the presenter will be able to easily determine the boundary area 22 if the position of the boundary area pattern 21 is set where there are physical objects or patterns that can be used as a marker on the imaging area 6, or if a menu screen printed on a paper surface is pasted on a wall in advance and the position of the boundary area pattern 21 is set in accordance with the screen.

By having the configuration described above, the position of the boundary area pattern 21 can be easily specified on the information terminal apparatus 3, and the boundary area 22 having the shape of the boundary area pattern 21 can be set at an arbitrary position on the imaging area 6 of the imaging apparatus 2. Furthermore, by having various shapes, sizes, and rotated shapes for the boundary area pattern 21, the boundary area 22 can be set with a high degree of freedom.

In the present embodiment, although an example has been shown in which setting of the boundary area 22 is conducted on the information terminal apparatus 3, if the shape of the boundary area pattern 21 is determined in advance, it is also possible to set a position pointed by a transmission device as the display coordinate 23 of the boundary area pattern 21.

Embodiment 4

Figure 16:
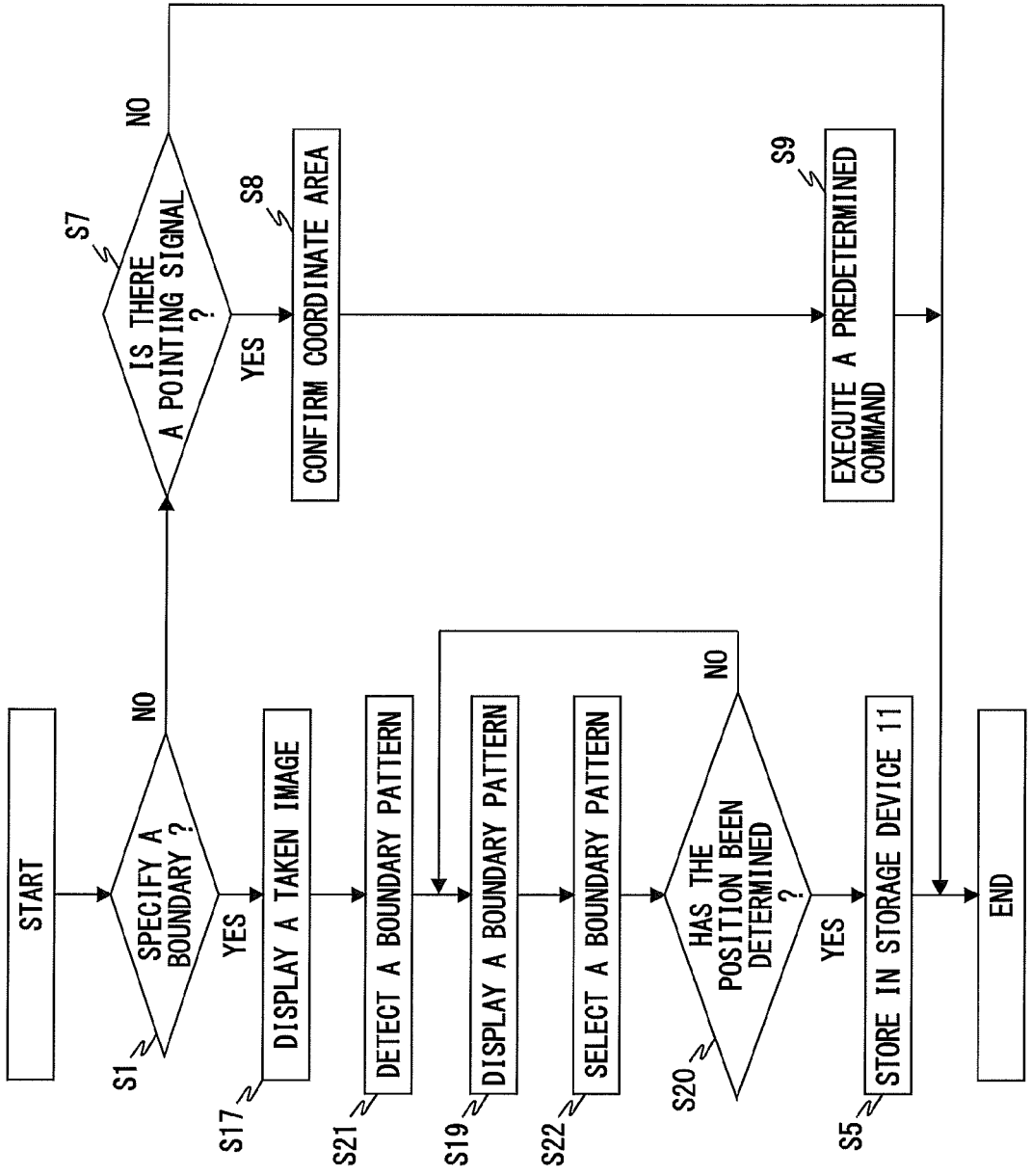
FIG. 16 is a flowchart for describing an operation of an interactive presentation system according to embodiment 4 of the present invention.
Figure 17:
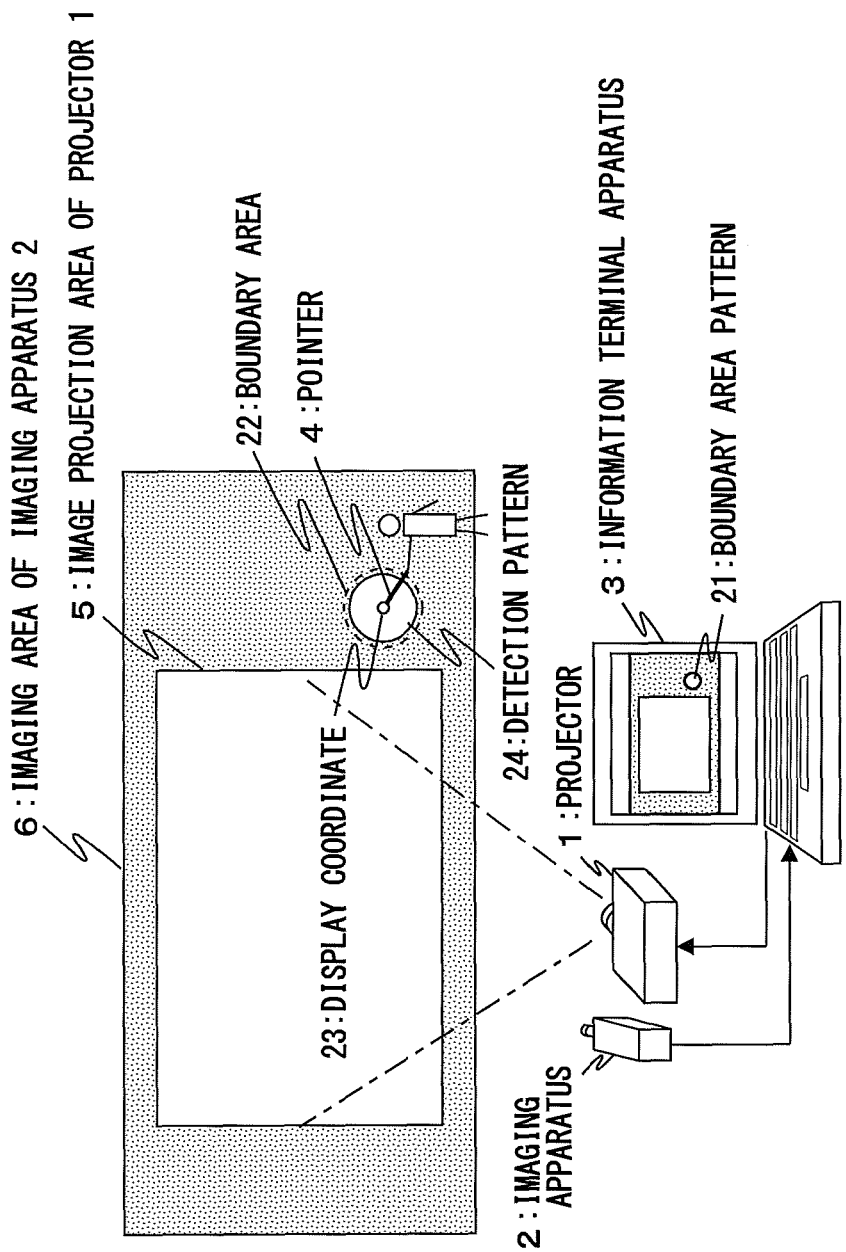
FIG. 17 shows one example of a boundary area pattern generated by a pattern generation device according to embodiment 4.
Figure 18:
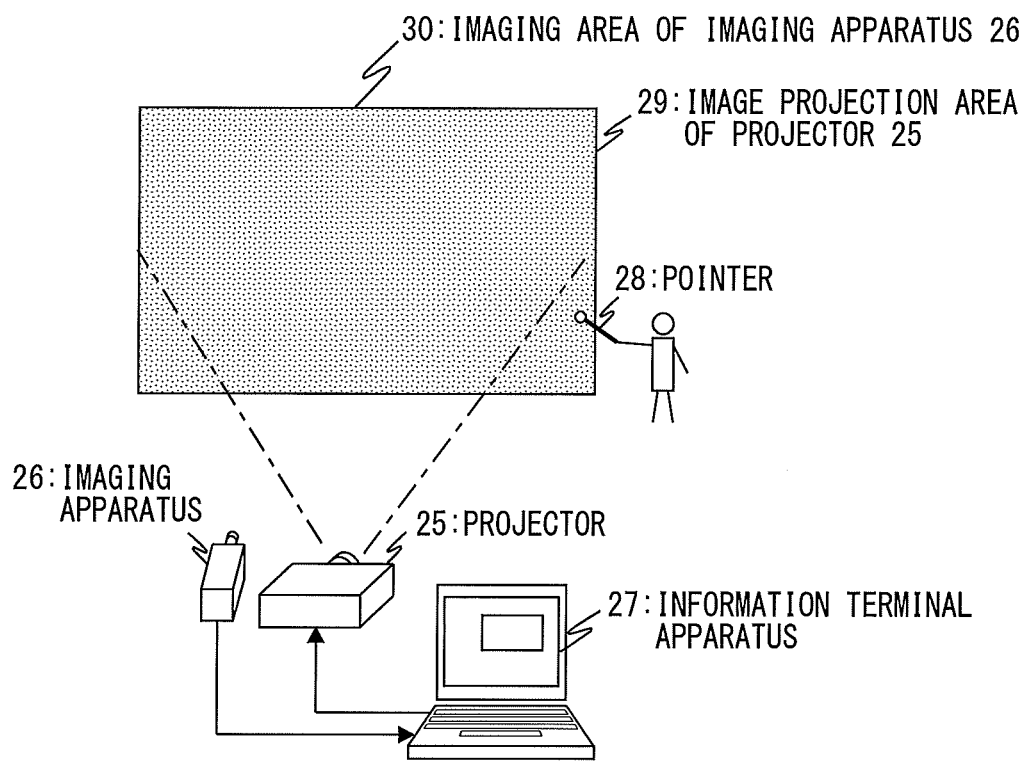
FIG. 18 shows a configuration of a conventional interactive presentation system.

FIG. 16 is a flowchart for describing an operation of an interactive presentation system according to embodiment 4 of the present invention, and FIG. 17 shows one example of the boundary area pattern 21 generated by the pattern generation device in embodiment 4.

With regard to the reference characters, element 24 represents a detection pattern used when detecting, as the boundary area pattern 21, an image printed on a surface of a paper or a pattern affixed to a wall or the like existing in the imaging area 6.

By using the flowchart in FIG. 16 for describing an operation, described next is an example in which a detection pattern having a circle shape formed by a solid line is detected as the boundary area 22 as shown in FIG. 17, and an area within the boundary area 22 around the center coordinate of the boundary area 22 is set as an operation area.

First, in order to specify the boundary area 22 from the information terminal apparatus 3, the presenter operates the information terminal apparatus 3 by using the input device 14 to issue an image display command (step S17). The control device 10 that has received the image display command at step S17 acquires a taken image for the image analysis device 9, and displays the taken image on the information terminal apparatus 3 via the image display device 13. After step S17, by using the input device 14, the presenter issues a detection command to the information terminal apparatus 3 for detecting the boundary area pattern 21 (step S21). The control device 10 that has received the detection command at step S21 causes the image analysis device 9 to extract the boundary area pattern 21 existing in the taken image (step S21).

A center coordinate position of the boundary area 22 having a detection pattern 24 that is determined to have the same shape as the boundary area pattern 21 at step S21 is defined as the center coordinate of the pattern, and an image of the boundary area pattern 21 shown in FIG. 17 is overlapped by the image overlap device 20 and displayed on the information terminal apparatus 3 via the image display device 13 (step S19).

Although an example is shown in FIG. 17 in which as the boundary area pattern 21, a circular area is displayed on the information terminal apparatus 3, similar advantageous effects can also be obtained when the patterns are plural in quantity, or when their geometry is not circular, or when they are not of consistent size. Furthermore, although an example has been shown in which the coordinate of the center of the shape of the boundary area pattern 21 is defined as the center coordinate, it does not necessary have to be the center as long as the coordinate of the boundary area pattern 21 and the coordinate of a single point in the area are stored in the storage device 11.

It should be noted that the pointing signal pointed by the presenter may vertically vibrate at a certain degree. In this case, particularly when there are multiple boundary area patterns 21 set adjacent to each other, there is a possibility of multiple commands being executed one after another, resulting in a presentation that is extremely difficult to follow. Such a problem can be easily avoided by setting, as a void area, around 5% of the boundary position coordinate stored in the storage device 11 of the control device 10. It then becomes impossible to set operation commands when the multiple boundary area patterns 21 share the same area. Such a problem can be easily avoided by setting, as a void area, the area of a detection pattern 24 that has the highest similarity to the boundary area pattern 21, and by setting such area as a void area for other areas.

After step S19, the presenter operates the information terminal apparatus 3 by using the input device 14 to select the boundary area pattern 21 that is to be actually used as the boundary area 22 (step S22). After step S22, the presenter issues, to the information terminal apparatus 3 by using the input device 14, a determination command for determining a position of a display coordinate for the boundary area pattern 21 that has been selected by using the input device 14 (step S20). The control device 10 that has received the determination command at step S20 stores the coordinate of the center position of the boundary area pattern 21 and the coordinates for the shape of the boundary area pattern 21 in the storage device 11 (step S5). As a result, it becomes easy to determine which command is being pointed by the pointing signal, by comparing the coordinate of the pointing signal detected at step S8 and the coordinate of the boundary area 22 stored in the storage device 11. An obtained detection result enables the control device 10 to execute a predetermined command.

With the configuration described above, the boundary area 22 having the shape of the boundary area pattern 21 can be automatically set, by detecting the boundary area pattern 21 in a taken image, and selecting on the information terminal apparatus 3 the boundary area pattern 21 that is to be actually used. Furthermore, by having various shapes, sizes, and rotated shapes for the boundary area pattern 21, the boundary area 22 can be set with a high degree of freedom.

With the interactive presentation systems according to the present invention, an operation area can be set at an arbitrary position outside an image projection area, by having an apparatus configured to take an image of an area outside the projection area with a use of an imaging device, cause the system to identify an arbitrary position that has been pointed, and set boundary coordinate settings for the operation area. As a result, even when a presenter is of relatively shorter stature, such as is the case with a child, or when the image projection area is a big screen, there will not be any areas that cannot be reached and pointed by the presenter by setting boundary positions in an initialization stage. Furthermore, present invention can solve problems associated with operations in interactive presentation systems in apparatuses using projectors.

What is claimed is:

1. An interactive presentation system for providing instructions regarding a projected image through interactive operations, the interactive presentation system comprising:
    an imaging device configured to capture an image over an imaging area including an area of the projected image and outside of the area of the projected image;
    an image analysis device configured to calculate positional information regarding a pointed position by using image data of the image captured by the imaging device;
    a control device configured to receive the positional information calculated by the image analysis device as an input and operate based on information inputted from an input device;
    a storage device configured to store the positional information calculated by the image analysis device under control of the control device;
    an image display device; and
    a projector configured to enlarge and project an output from the image display device; wherein in an initialization stage in which initialization is conducted based on the information inputted from the input device, the control device stores, in the storage device, a boundary position of a command, which defines an operation area to be set outside the area of the projected image in the imaging area, with a predetermined command being assigned to the operation area, and
    the control device compares a pointed position obtained via the imaging device and the boundary position stored in the storage device in the initialization stage, and executes the predetermined command associated to the positional information regarding the pointed position.

2. The interactive presentation system according to claim 1, further comprising a pattern generation device configured to generate a pattern image under control of the control device, wherein:
    in the initialization stage, the control device causes the pattern generation device to output an initialization pattern image enabling specifying of an area for receiving an enlarged projection from the projector, and ascertains, based on positional information calculated by the image analysis device, a position-coordinate correlation between an area whose image is captured by the imaging device, and an area for receiving a projection from the projector.

3. The interactive presentation system according to claim 1, comprising:
an imaging apparatus including an imaging device, an image analysis device, and a first communication device configured to communicate positional information calculated by the image analysis device; and
an information terminal apparatus including a control device, a storage device, an image display device, and a second communication device configured to communicate with the first communication device and output the positional information to the control device; wherein
the positional information consists exclusively of coordinate data.

4. The interactive presentation system according to claim 3, comprising:
a projector including an imaging apparatus; and
an information terminal apparatus.

5. The interactive presentation system according to claim 1, comprising a transmission device configured to transmit a pointing signal, wherein:
the imaging apparatus captures an image including the pointing signal transmitted from the transmission device; and
the image analysis device calculates, as the positional information regarding a pointed position, positional information of the pointing signal transmitted from the transmission device by using the image data.

6. The interactive presentation system according to claim 1, further comprising:
a pattern generation device configured to generate a pattern image under control of the control device; and
an image overlap device configured to overlap the pattern image generated by the pattern generation device onto an image to be projected to the area of the projected image, the image being outputted from the control device; wherein
the image display device receives an output from the pattern generation device as an input, and an output from the image overlap device as an input, and
after the initialization stage, the control device causes the pattern generation device to generate, as the pattern image, a marker image for the boundary position stored in the storage device in the initialization stage, and output the marker image to the image overlap device.

7. The interactive presentation system according to claim 1,
wherein
in the initialization stage, the control device causes the imaging device to capture an image including a first area pattern, the image being provided outside the area of the projected image in the imaging area, detects the first area pattern included in the captured image, sets the detected first area pattern as a boundary area pattern that defines the boundary position, the boundary position being the operation area, assigns the predetermined command to the boundary area pattern, and stores the boundary area pattern in the storage device.

* * * * *